(12) United States Patent
Bittner (10) Patent No.: US 6,647,207 B2
(45) Date of Patent: Nov. 11, 2003

(54) PARALLAX CORRECTION FOR CLOSE FOCUS

(75) Inventor: Wilfried Bittner, Hong Kong (CN)

(73) Assignee: Concord Camera Corp., Hollywood, FL (US)

(*) Notice: Subject to any disclaimer, the term of this patent is extended or adjusted under 35 U.S.C. 154(b) by 0 days.

(21) Appl. No.: 10/055,801

(22) Filed: Jan. 23, 2002

(65) Prior Publication Data

US 2003/0138248 A1 Jul. 24, 2003

(51) Int. Cl.[7] ............................................... G03B 13/14
(52) U.S. Cl. ........................................ 396/377; 396/84
(58) Field of Search ................................ 396/377, 133, 396/72, 77, 84, 87

(56) References Cited

U.S. PATENT DOCUMENTS

| | | | |
|---|---|---|---|
| 2,552,244 A | * 5/1951 | White | ..................... 396/353 |
| 4,924,247 A | 5/1990 | Suzuki et al. | |
| 5,173,726 A | * 12/1992 | Burnham et al. | ............ 396/149 |
| 5,461,442 A | 10/1995 | Ohshita | |
| 5,594,518 A | * 1/1997 | Ohshita | ..................... 396/133 |
| 5,778,261 A | * 7/1998 | Tanaka et al. | ................. 396/55 |
| 6,243,539 B1 | 6/2001 | Chen | |

* cited by examiner

Primary Examiner—Russell Adams
Assistant Examiner—Michael Dalakis
(74) Attorney, Agent, or Firm—Scott L. Lampert; Kerry Sisselman (57) ABSTRACT

A parallax compensation system and method is provided for a camera including an independent viewfinder. For close focus pictures, the camera's taking lens is shifted towards the viewfinder. In one embodiment, for far focus pictures the camera's taking lens is moved away from the viewfinder and is not centered on the image recording medium axis. The lens shifting is accomplished by mounting the taking lens eccentrically in a lens barrel. Rotation of the lens barrel shifts the taking lens towards the independent viewfinder for close focus shots. In one embodiment, the viewfinder axis is tilted towards the taking lens to help eliminate parallax in close focus pictures.

20 Claims, 9 Drawing Sheets

PARALLAX CORRECTION FOR CLOSE FOCUS

FIELD OF THE INVENTION

The present invention relates to the field of cameras and, more particularly, to a parallax compensation system for a camera.

BACKGROUND OF THE INVENTION

Cameras having non-through the lens viewfinders, that is, viewfinders with an optical axis distanced from the image capture optical axis, exhibit a problem with parallax error at close shooting distances. At normal shooting distances (1.5 m to infinity) the parallax error is negligible. However, at very close shooting distances (i.e. 0.25 m), the parallax error causes unacceptable aiming mistakes. There are several existing methods to address this problem: 1) ignore it for very low-end cameras and simply accept aiming errors; 2) add so-called parallax markings in the bright frame mask, which require the user to remember to use those markings to recompose the subject if it is at close distance; 3) use a bright frame viewfinder with parallax markings and control the visibility of those markings automatically with moving masks or with liquid crystal panels; 4) employ an elaborate mechanism to couple the viewfinder mask or bright frame to the focusing movement of the lens, which mechanism typically comprises cams and levers and even motors in some high-end cameras.

A number of patents have tried different means for addressing the parallax error in cameras at close shooting distances. U.S. Pat. No. 6,243,539 to Chen provides a parallax compensation apparatus for a camera which comprises a viewfinder pivotally connected to a camera for locating objects to be taken. A follower link connected to the camera and having one end pivotally connected to the viewfinder causes the viewfinder to pivot, moving the adjusting device such that the optical axis of the viewfinder meets the optical axis of the lens in the subject to be taken.

U.S. Pat. No. 4,924,247 to Suzuki et al., relates to an apparatus and method for correcting and adjusting parallax in an electronic camera. Suzuki provides a parallax correcting apparatus which comprises an imaging device driving mechanism for supporting and moving an imaging device away from and towards the optical axis of the finder optical system.

Although somewhat effective for their intended purpose, the prior art devices are complicated and expensive. What is needed is a mechanically simple, inexpensive system for correcting parallax in a camera having an independent viewfinder. This object, as well as others, is satisfied by the present invention.

SUMMARY OF THE INVENTION

A parallax compensation system and method is provided for a camera including a non-through the lens viewfinder. The taking lens of a camera is mounted eccentrically in a cylindrical lens barrel. The lens barrel is rotated to shift the taking lens towards the viewfinder for close focus shots. Additionally, in one particular embodiment, the viewfinder axis is tilted towards the rotated taking lens axis to help eliminate parallax in close focus pictures.

These and other objects and advantages of the present invention will become more readily apparent in the description which follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred it being understood, however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

The present invention relate to a camera with a first fixed-focus setting for normal shooting distances and a separate fixed-focus setting for close-up pictures. The fixed-focus setting for close distances is used to shift the center of the lens relative to the center of the image frame so as to help compensate for the parallax error of the viewfinder.

Figure 1A:
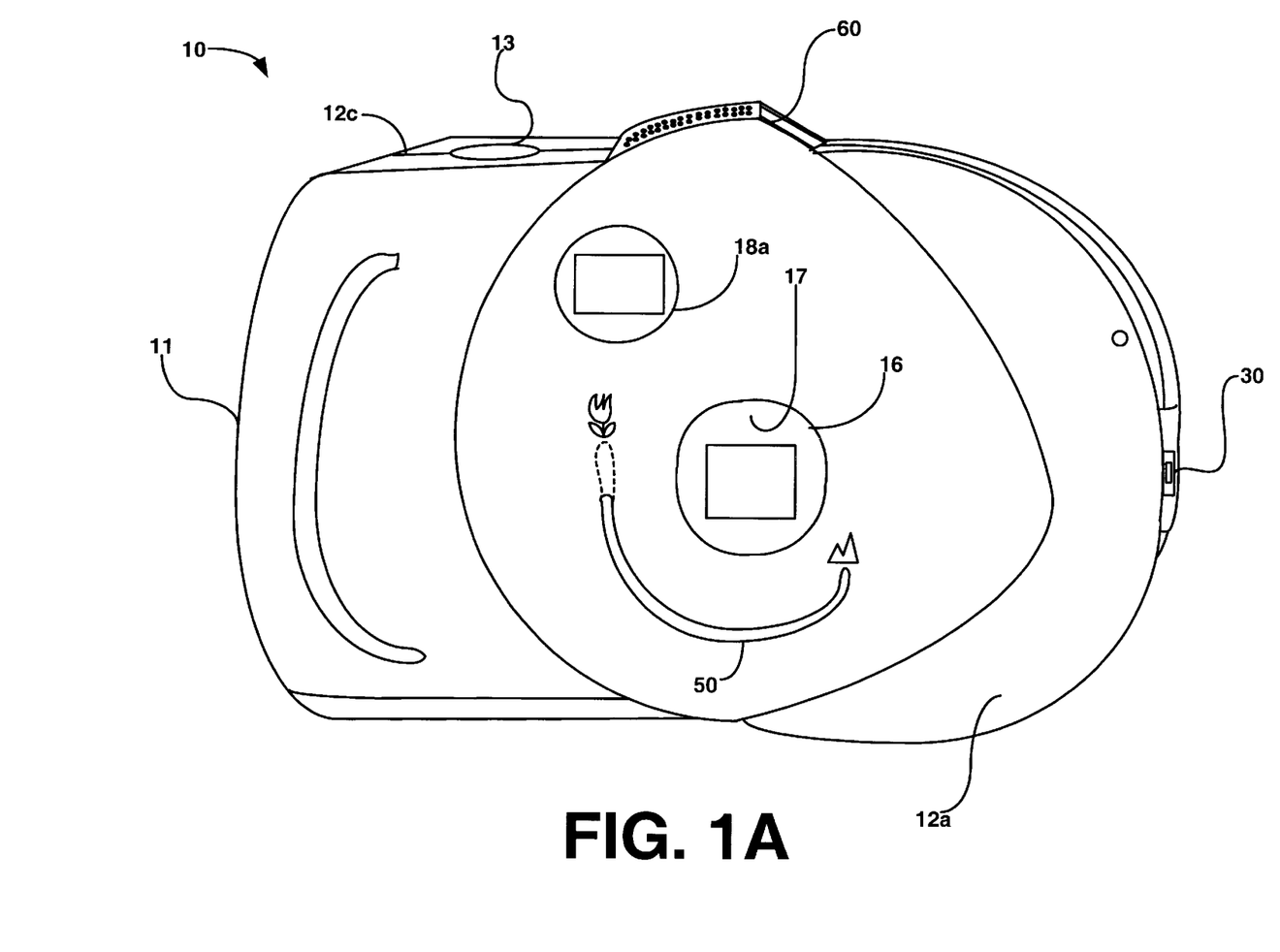
FIG. 1A is a perspective view from the front, right side of an exemplary camera useful with the present invention.
Figure 1B:
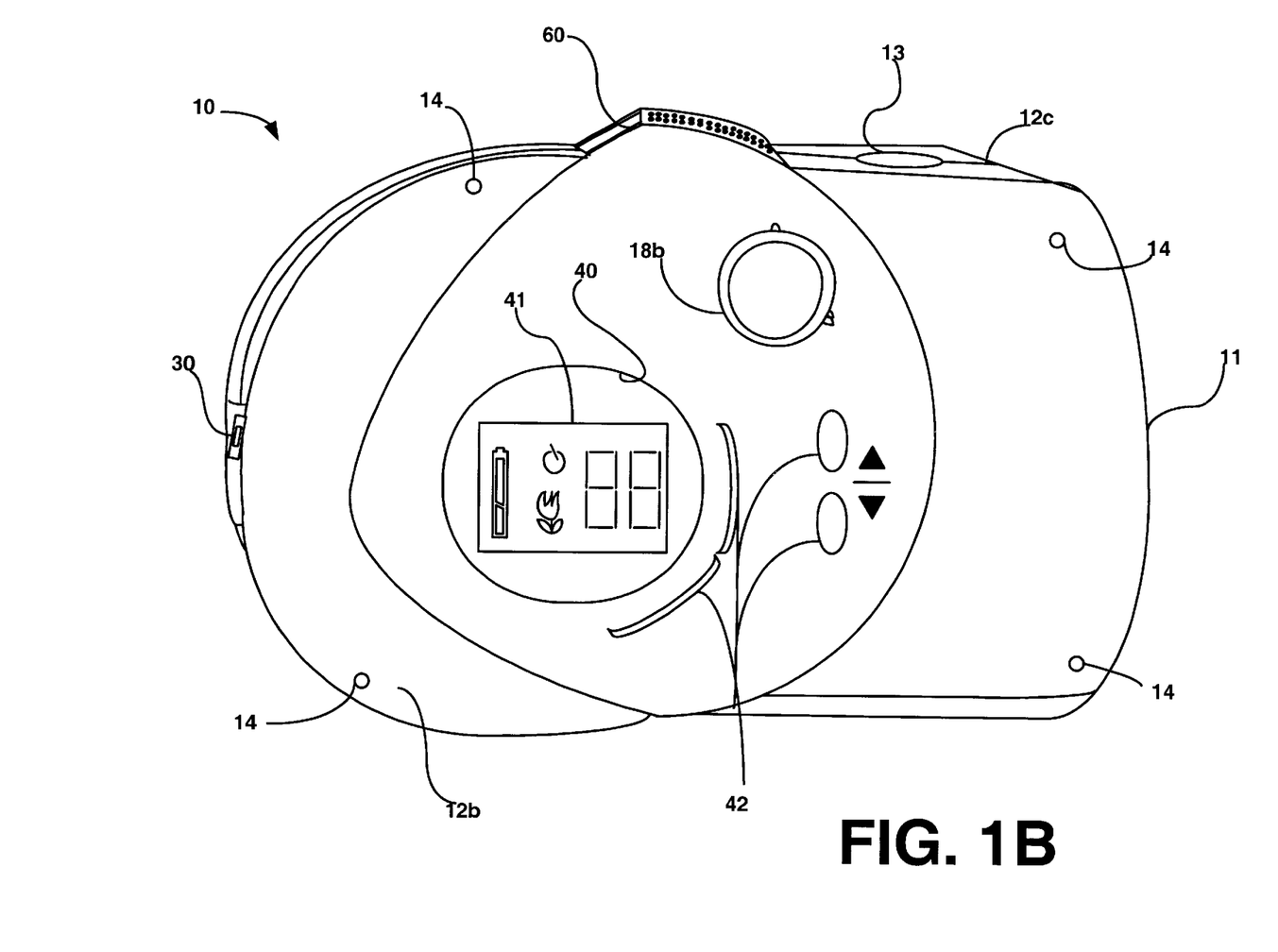
FIG. 1B is a perspective view from the rear, right side of the camera of FIG. 1A.

Referring now to FIGS. 1A and 1B, the camera 10 includes an outer housing 11 having a front portion 12a and a back portion 12b. The front portion 12a and the back portion 12b are made as two separate pieces to facilitate manufacturing of the housing 11. It should be appreciated, however, that the housing may, alternatively, be comprised of any number of pieces. Additionally, the outer surfaces of the front 12a and back 12b portions may be contoured, if desired, to improve gripping capabilities and provide a more ergonomic and aesthetically pleasing design. In the preferred embodiment, the housing 11 is constructed of a lightweight, yet rugged plastic material, but may, alternatively, be constructed of an alloy material, a metallic material or any other suitable material.

Front portion 12a of housing 11 is adapted for connective engagement with the corresponding back portion 12b using conventional fastening means. The two halves form a substantially light tight connection when assembled together. In the present embodiment, the front and rear portions 12a and 12b are secured together using screws 14.

The front and back portions 12a, 12b include a plurality of openings integrally formed therein. The openings are structured and disposed to accept the taking lens (opening 16)defining an image capture optical axis and a viewfinder assembly (openings 18a and 18b) defining an image framing optical path, the viewfinder assembly disposed apart from the taking lens. Other openings may also be included to accommodate other features, such as a battery door, function select controls, a flash and/or an external connector.

A trigger button 13 is accessible through an opening disposed on the top face 12c of the housing 11.

An external interface cavity 30 is also integrally formed in the camera housing 11 and is accessible by moving the interface door 31. External interfaces are disposed within the external interface cavity 30 for interconnection with an external device, such as a computer, printer, television or video monitor, imaging device, etc.

A status indicator opening 40 is provided through the rear housing 12b. A status LCD 41 is mounted on the rear housing 12b. Additional openings for a number of user select buttons 42 are additionally provided through the rear housing, and are disposed in close proximity to the status indicator. The number and orientation of the user select buttons 42 may vary to accommodate the particular camera 10 layout. Similarly, the functions provided may vary. Typical function selects include, on/off, timer on/off, etc. Additionally, the status LCD 41 may provide a variety of desired information including timer indication, battery status, number of remaining pictures, mode indicator, etc.

The present exemplary camera additionally includes a mirror slide switch 60 slideably engaged with the top face 12c of the housing 11. Further, as will be described more filly herein, camera 10 includes a wiper switch 50 that slides in a groove formed in the front housing 12a and which switches the camera mode between normal and macro.

Figure 2A:
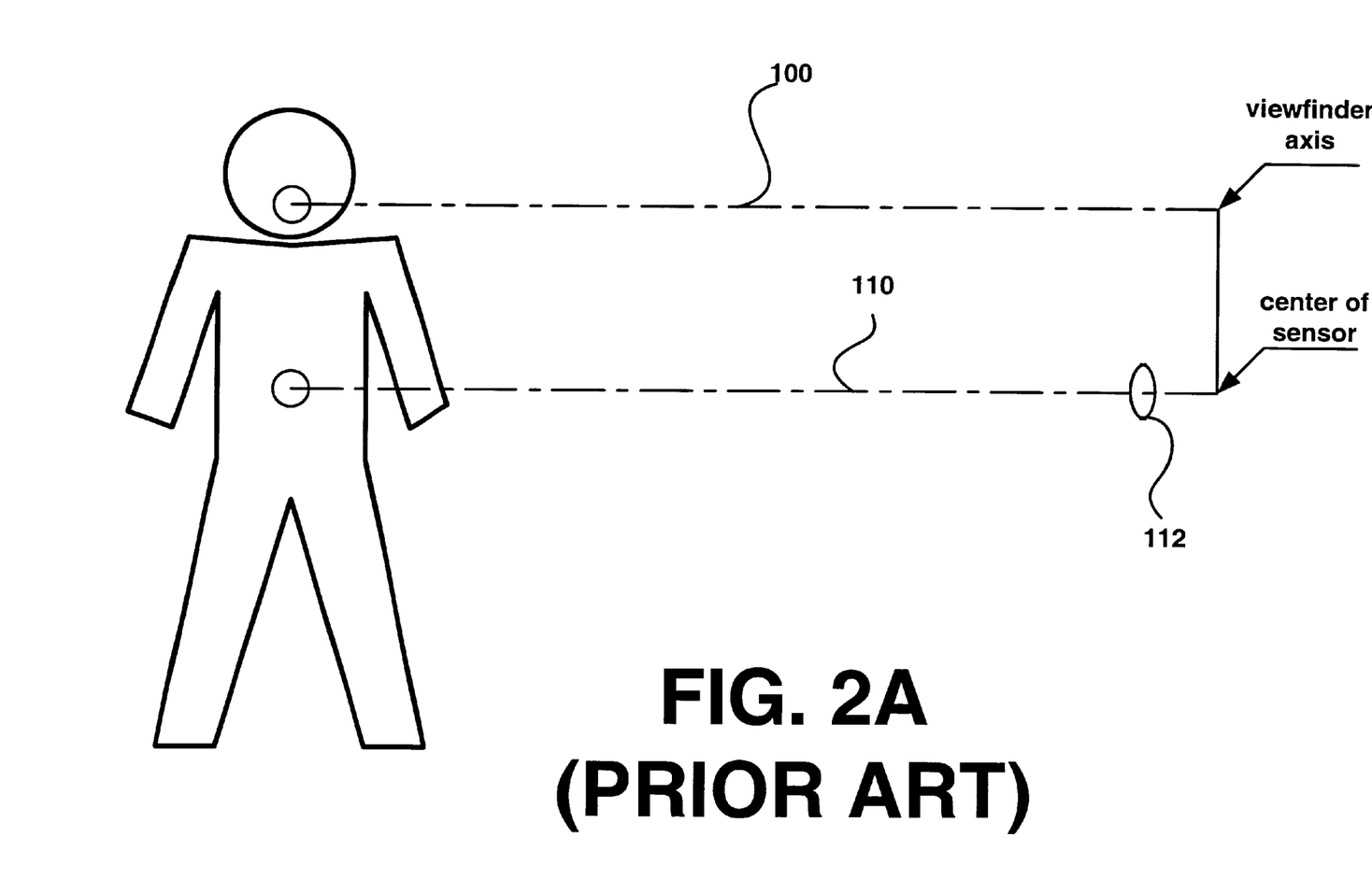
FIG. 2A demonstrates the parallax encountered at close range with a standard camera having an independent viewfinder.

Referring now to FIG. 2A, there is shown a schematic illustration showing parallax error in a close focus picture taken with a conventional camera. A viewfinder optical axis 100 is defined through the center of the viewfinder of the camera. An image capture optical axis 110 is defined through the center of the camera image sensor. The viewfinder optical axis 100 and the image capture optical axis 110 are fixed parallel to each other. Objective taking lens 112 is centered on the sensor axis 110. Parallax is defined as the difference between the area taken in by a camera lens and the area seen in the viewfinder. The closer the subject is to the camera, the greater the parallax. As such, at close range, the image recorded by the sensor is shifted as compared to the image framed in the viewfinder.

Figure 2B:
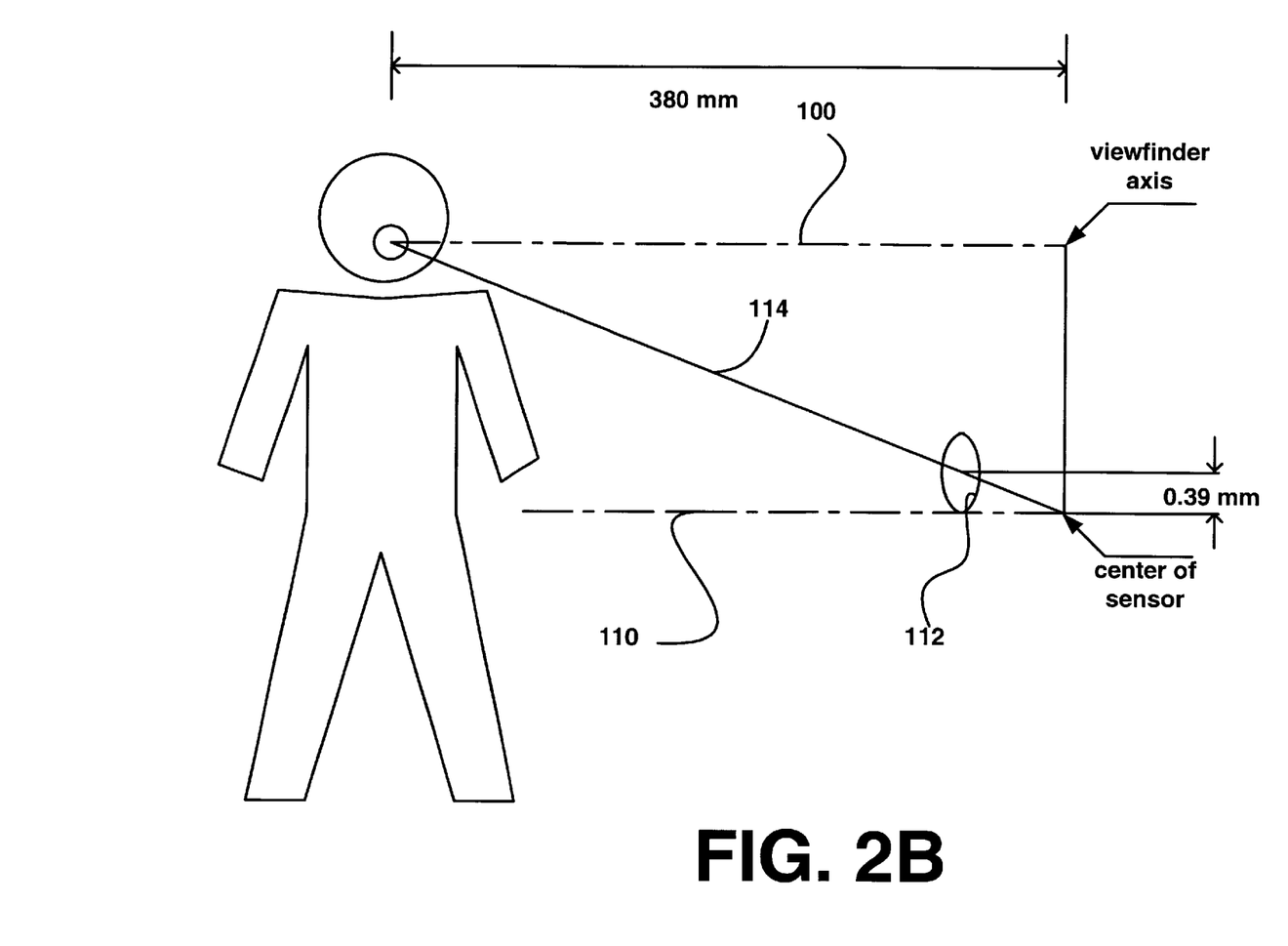
FIGS. 2B–2D demonstrates the elimination of parallax at close range in a camera made in accordance with various embodiments of the present invention.

Referring now to FIG. 2B, there is shown a schematic illustration using a camera in accordance with one embodiment of the present invention. To compensate for parallax in the present embodiment, objective taking lens 112 is shifted towards the viewfinder axis. Although the image sensor is not shifted, shifting the lens alters the focus of the sensor. Once shifted, the parallax between the viewfinder and the taking lens is eliminated at a relatively close focal length, where the newly defined optical center axis 114 converges with the viewfinder axis 100. The amount of lens shift needed can be described by the following equation:

Lens Shift=Parallax Distance×Focal Length/Subject Distance (1)

where, parallax distance is the distance between the taking lens center and the viewfinder center.

In one particular implementation shown in FIG. 2B, the taking lens 112 was shifted 0.39 millimeters causing the lens axis 114 to converge with the viewfinder axis 100 at 380 mm, thus eliminating parallax at this distance. However, it has been found that shifting the lens center 112 too far from the sensor center can cause degradation in the corners of the picture.

Figure 2C:
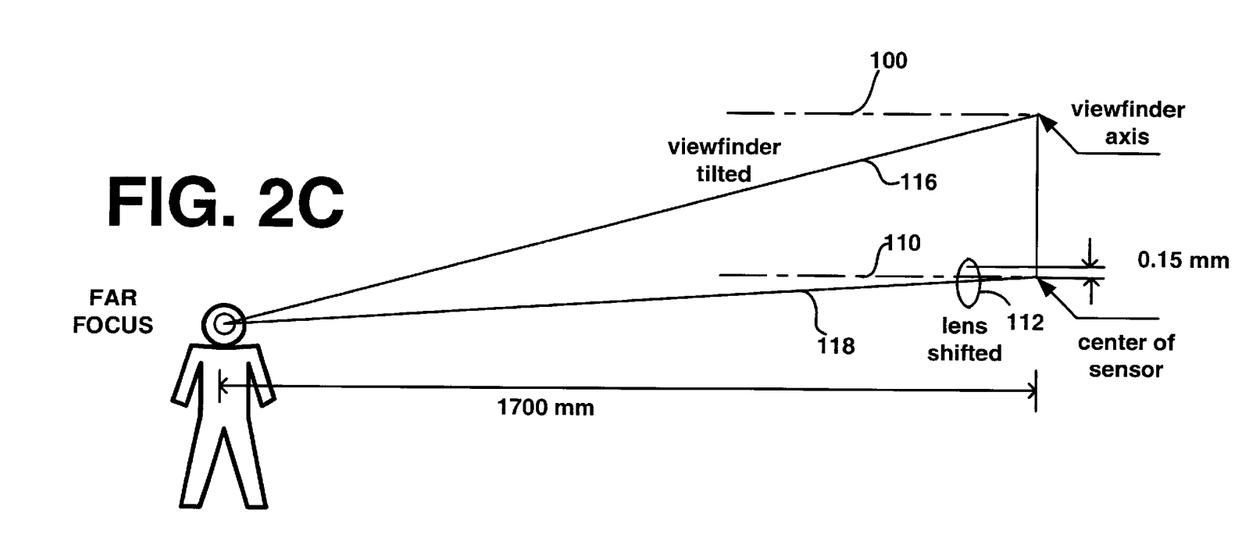
Figure 2D:
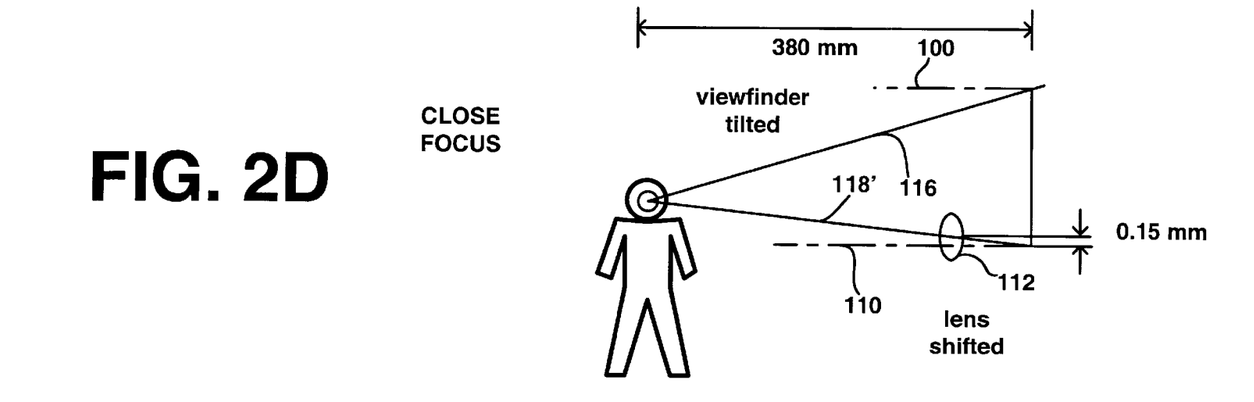

Referring now to FIGS. 2C and 2D, there is shown another embodiment of the camera of the present invention. In the embodiment of FIGS. 2C and 2D, to prevent the lens from shifting too far from the center of the sensor, the taking lens 112 is shifted a small distance away from the viewfinder axis 100 for far focus shots, but is shifted towards the viewfinder axis 100 for close focus shots. Additionally in this embodiment, the viewfinder is tilted towards the sensor axis 110. To reduce cost, the viewfinder of the present embodiment is permanently angled towards the taking lens, defining an adjusted viewfinder axis 116.

For far focus shots, the taking lens 112 is shifted away from the adjusted viewfinder axis 116, defining an adjusted far focus lens axis 118. For close focus shots, the taking lens 112 is shifted towards the adjusted viewfinder axis 116, defining the adjusted viewfinder close focus axis 118'.

In one particular implementation having the viewfinder permanently tilted, as shown in FIG. 2C, shifting the taking lens 112 away from the viewfinder axis 100 by 0.15 millimeters from the original lens axis 110 resulted in a far focus convergence of the adjusted viewfinder axis 116 with the adjusted far focus lens axis 118 at 1700 millimeters. In the same embodiment, as shown in FIG. 2D, shifting the taking lens 112 towards the viewfinder axis 100 by 0.15 millimeters from the original lens axis 110 resulted in a close focus convergence of the adjusted viewfinder axis 116 with the adjusted close focus lens axis 118' at 380 millimeters, thus eliminating parallax at that distance.

Figure 3A:
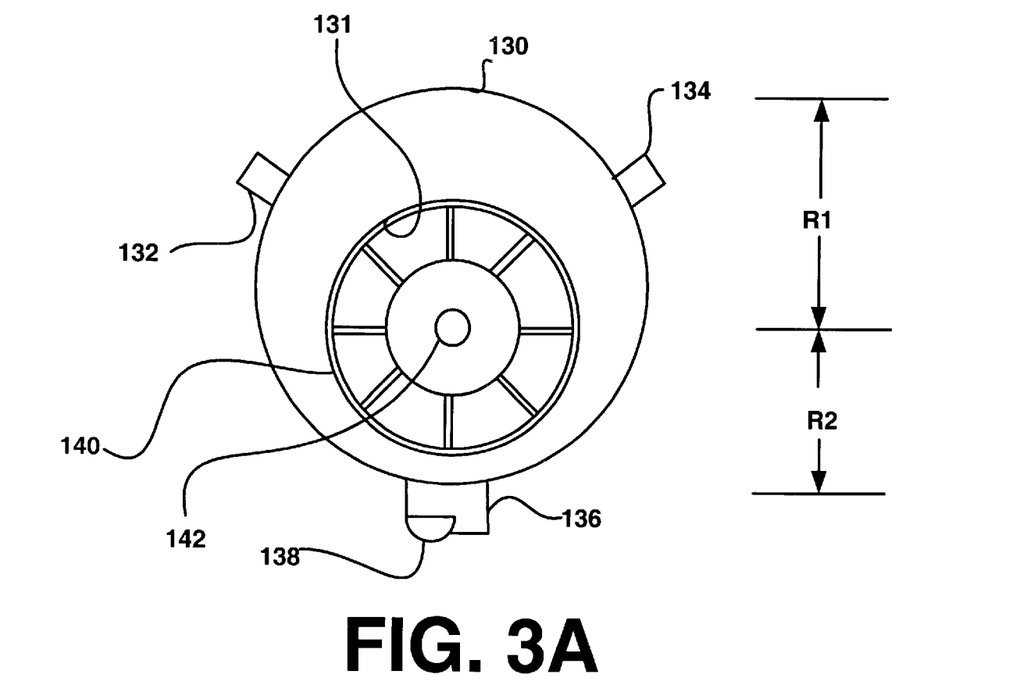
FIG. 3A is a front plan view of an eccentric lens barrel in accordance with one embodiment of the present invention.
Figure 3B:
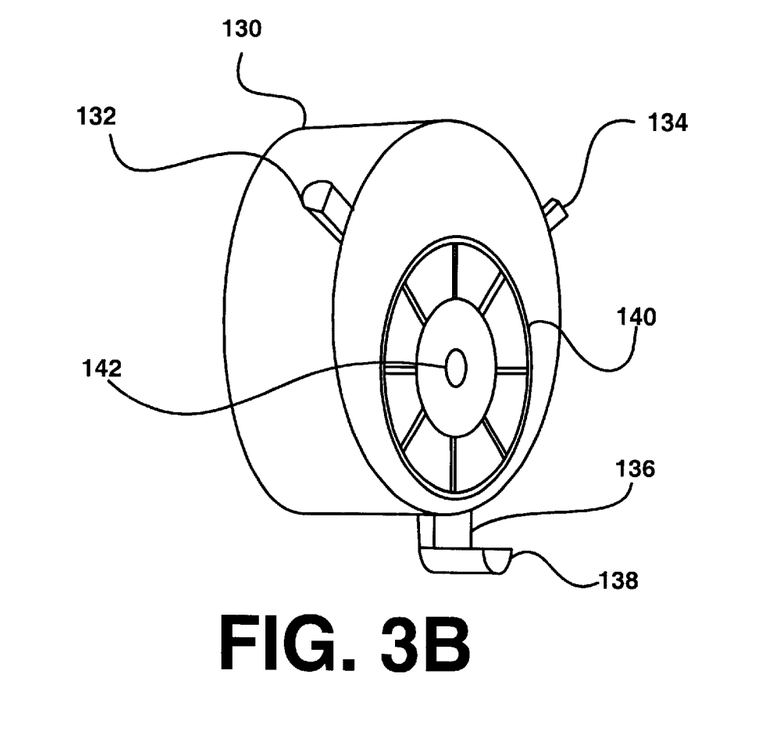
FIG. 3B is a side perspective view of the eccentric lens barrel of FIG. 3A.

Referring now to FIGS. 3A and 3B, there is shown one embodiment of an eccentric taking lens barrel 130 which may be used to implement the lens shift described in connection with the FIGS. 2B–2D. An eccentric taking lens barrel 130 is shown such that the barrel includes a bore 131. Although the lens barrel 130 is cylindrical in shape in this particular embodiment, the bore 131 is located off center in the lens barrel 130 such that the length R1 is significantly greater than length R2, where R1 is measured from the center of the bore to the furthest outer edge of the lens barrel 3O and R2 is measured from the center of the bore to the closest outer edge of the lens barrel 130. The lens assembly 140, including the taking lens group 142, is mounted in the bore 131. The taking lens barrel 130 additionally includes cam arms 132, 134 and 136, which engage cam surfaces on the body of the camera to limit the range of motion, when the lens barrel is rotated. Cam arm 136 further includes the wiper post 138. Wiper post 138 interfaces with a wiper or switch outside the camera housing to permit the user to manually rotate the lens assembly 140.

Figure 4A:
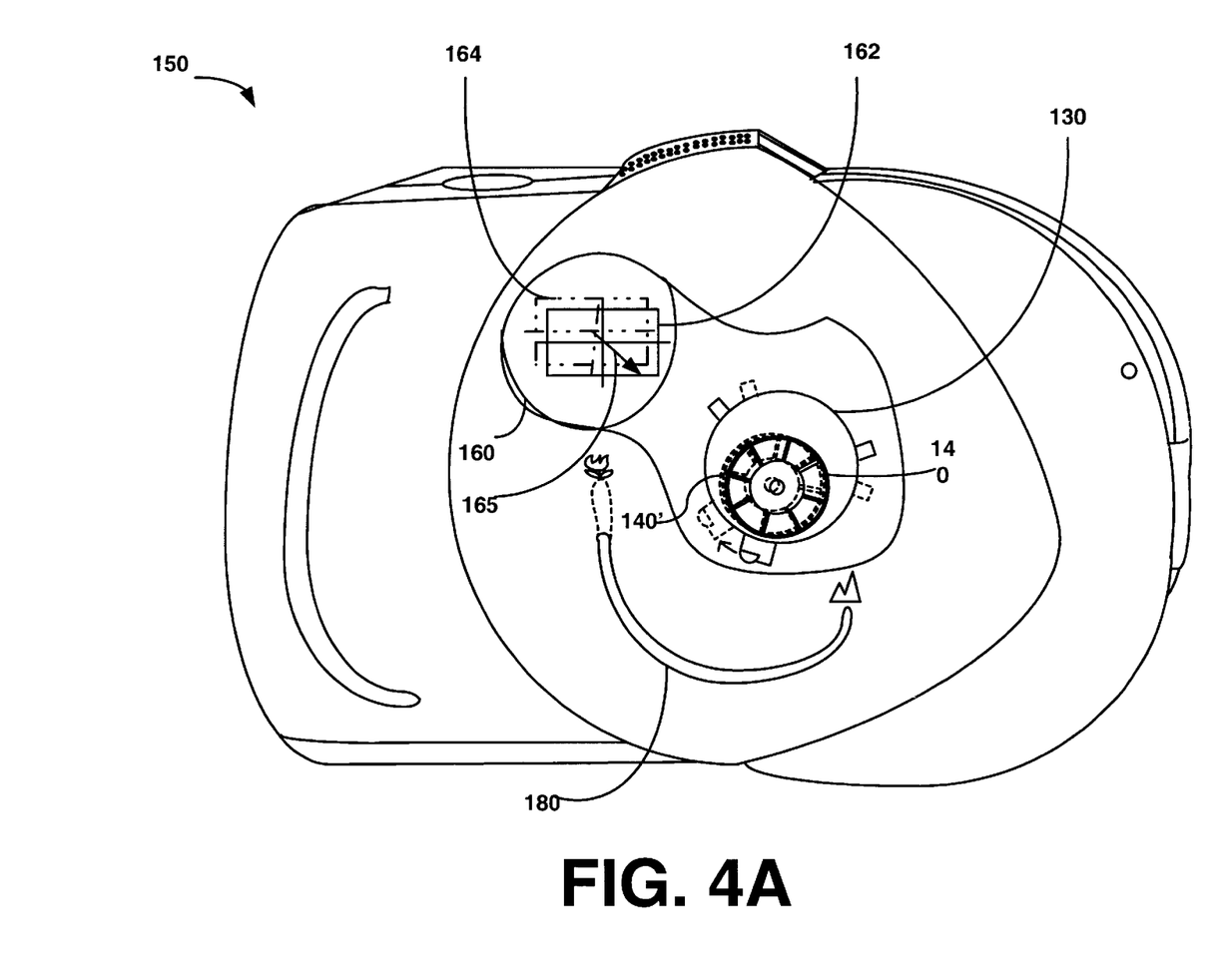
FIG. 4A is a front partial cut-away view of a camera made in accordance with one embodiment of the present invention.
Figure 4B:
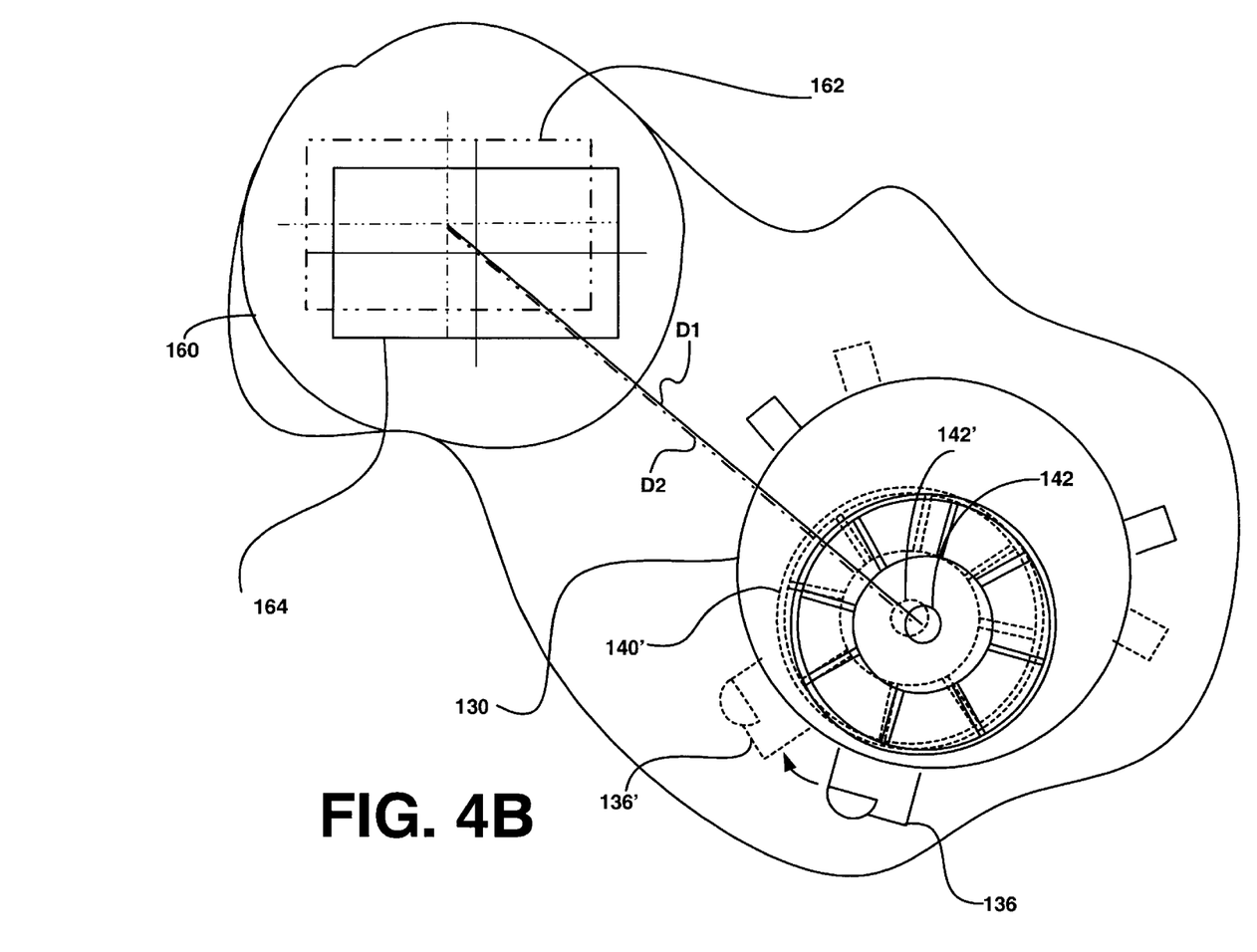
FIG. 4B is an enlarged view of the cut away portion of FIG. 4A.
Figure 4C:
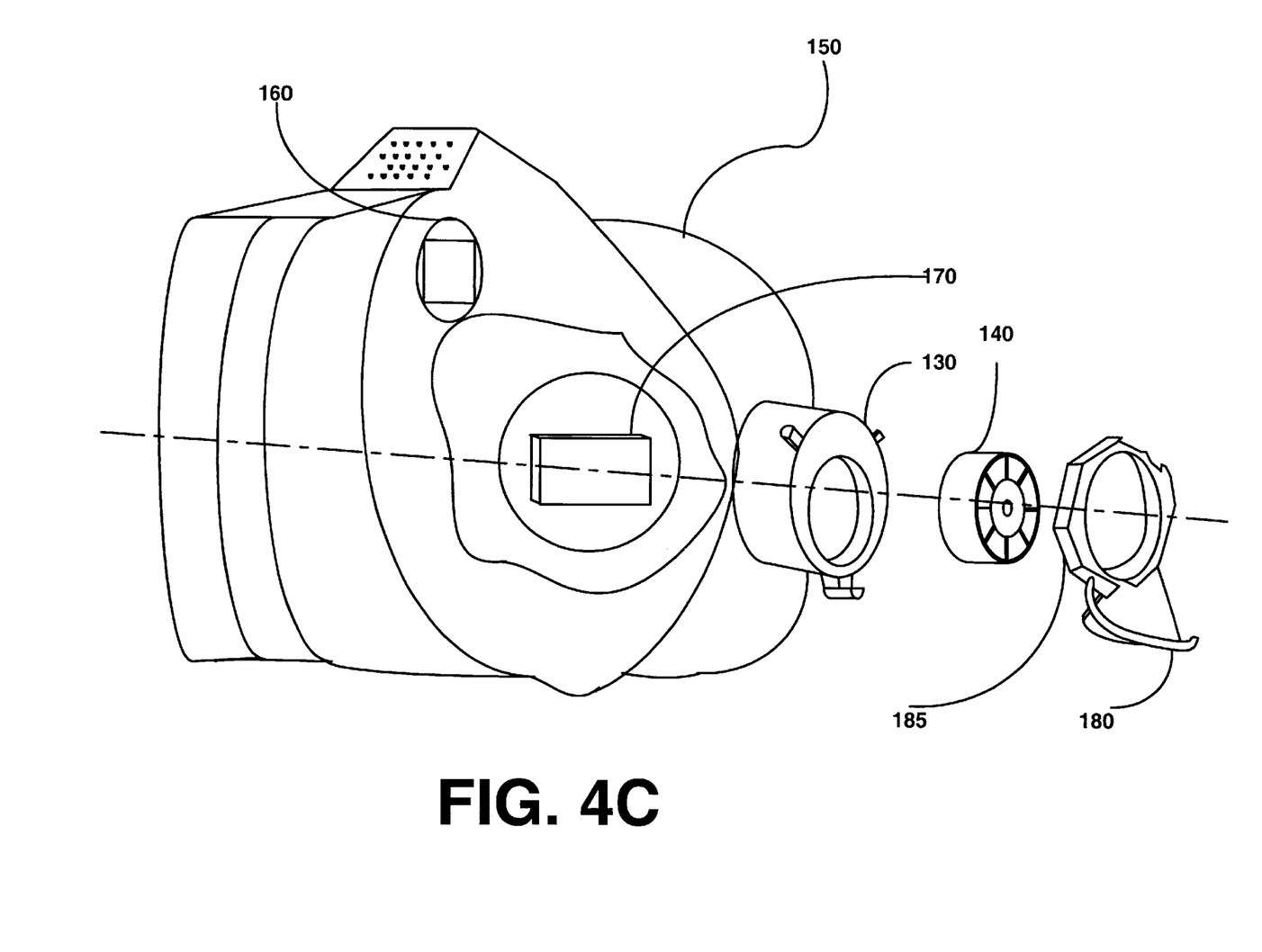
FIG. 4C is a side perspective, partial exploded view of the camera of FIG. 4A

Referring now to FIGS. 4A, 4B and 4C, there is shown a camera 150 that incorporates one embodiment of the present invention. Camera 150 includes a viewfinder assembly 160 having lenses 162 and 164 and a taking lens assembly 140 seated in an eccentric taking lens barrel 130. In the present embodiment, the viewfinder assembly of camera 150 is permanently tilted towards the taking lens 142 such that the vector 165 (FIG. 4A) defines the tilted viewfinder axis. Additionally, the eccentric lens barrel 130 is free to rotate only a prescribed amount in the camera body. Rotating the lens barrel 130 clockwise (as shown in shadow by the displacement 136', 140' of arm 136 and taking lens assembly 140, respectively) brings the taking lens 142 (142') closer to the viewfinder. Line D1 is the distance from the center of the viewfinder to the center of the unshifted taking lens 142. Line D2 is the distance from the center of the viewfinder to the center of the shifted taking lens 142'. As can be seen, when the eccentric lens barrel 130 is shifted the taking lens 142 is shifted (142') closer to the viewfinder. As described in connection with FIGS. 2B–2D, this reduces the parallax of the camera for close focus pictures, while having a negligible effect on far focus pictures. A sensor 170 seated in the body of camera 150 behind the taking lens 130 captures the image when the trigger (13 of FIGS. 1A and 1B) is depressed. An internal coupling ring 185 couples the eccentric lens barrel 130 to the front cover wiper 180 on the outside of the housing.

Note that the disclosed method of shifting the taking lens can be applied to all kinds of image capture devices including cameras wherein the image recording media is photographic film, or wherein the image recording media includes a CMOS or CCD sensor as described herein. The present invention is particularly suitable for digital cameras due to the small size of the image frame on the sensor and therefore the small amount the lens needs to shift sideways for parallax compensation. It is understood that the lens shift must be limited to the maximum extent of the image circle (maximum coverage of the lens) to avoid poor image quality in the corners.

While the invention has been described with reference to certain embodiments, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A camera, comprising:
    a viewfinder including an ocular lens and an objective lens, a viewfinder axis defined through the center of said ocular lens and said objective lens;
    an image recording medium, an image recording medium axis defined perpendicular to a plane containing said image recording medium;
    actuation means for selectively capturing an image on said image recording medium;
    a taking lens aligned with said image recording medium;
    a parallax correction mechanism in communication with said taking lens, said parallax correction mechanism having a close focus mode and a far focus mode, wherein operation of said parallax correction mechanism rotates said taking lens towards said viewfinder axis in said close focus mode.

2. The camera of claim 1, wherein said viewfinder axis is parallel to said image recording medium axis.

3. The camera of claim 1, wherein said viewfinder is tilted in said camera, such that said viewfinder axis is at an angle with respect to said image recording medium axis.

4. The camera of claim 3, wherein said taking lens is centered on said image recording medium axis in said far focus mode.

5. The camera of claim 3, wherein operation of said parallax correction mechanism from said close focus mode to said far focus mode rotates said taking lens away from said viewfinder axis.

6. The camera of claim 5, wherein said parallax correction mechanism includes a generally cylindrical taking lens barrel having said taking lens mounted therein.

7. The camera of claim 6, wherein said taking lens is mounted off center in said generally cylindrical taking lens barrel.

8. (Currently amended) The camera of claim 7, wherein rotation of said generally cylindrical taking lens barrel around said image recording medium axis rotates the center of said taking lens with respect to said image recording medium axis.

9. The camera of claim 8, additionally including a taking lens position switch, wherein actuation of said taking lens position switch rotates said generally cylindrical taking lens barrel between said far focus position and said close focus position.

10. The camera of claim 9, wherein said taking lens position switch is directly, mechanically linked to said generally cylindrical taking lens barrel so that manipulation of said taking lens position switch rotates said generally cylindrical taking lens barrel between said far focus position and said close focus position.

11. The camera of claim 1, wherein said image recording medium is an electronic sensor.

12. A camera, comprising:
    a main body including a viewfinder aperture therethrough and a lens barrel aperture, said lens barrel aperture aligned with an image recording medium;
    a lens barrel rotatably engaged within the lens barrel aperture;
    a viewfinder assembly seated within the viewfinder aperture, a viewfinder axis defined therethrough; and
    a taking lens assembly mounted in said lens barrel assembly;
    wherein rotation of said lens barrel in a first direction moves said taking lens assembly closer to the viewfinder axis.

13. The camera of claim 12, wherein said lens barrel is cylindrical in cross section.

14. The camera of claim 13, wherein said taking lens assembly is mounted in said lens barrel such that the center of said taking lens assembly is not located at the center of said lens barrel.

15. The camera of claim 14, additionally including a switch member located on said outer casing, said switch member in communication with said lens barrel so that movement of said switch member causes rotation of said lens barrel.

16. The camera of claim 15, wherein said viewfinder axis is angled to intersect with said taking lens axis.

17. A method of correcting parallax in a camera having a viewfinder and a viewfinder axis defined through the center of the viewfinder, an image recording medium, an image recording medium axis defined perpendicular to a plane containing the image recording medium, and a taking lens aligned with the image recording medium, comprising the steps of: rotating the taking lens towards the viewfinder axis for a close focus picture; and recording the desired image on the recording medium.

18. The method of claim 17, additionally including the step of rotating the taking lens away from the viewfinder axis for a far focus picture, wherein the viewfinder axis and the image recording medium axis are parallel to each other.

19. The method of claim 17, additionally including the step of rotating the taking lens away from the viewfinder axis for a far focus picture, wherein the viewfinder axis is tilted with respect to the image recording medium axis.

20. The method of claim 19, wherein said step of rotating the taking lens away from the viewfinder axis causes the taking lens to not be centered on the image recording medium axis.

* * * * *